(12) United States Patent
Hussein et al.

(10) Patent No.: US 10,804,947 B2
(45) Date of Patent: Oct. 13, 2020

(54) SYSTEM AND METHOD OF REDUCING SPECIFIC ABSORPTION RATE FROM MOBILE DEVICES

(71) Applicant: Leap Comtec Limited, London (GB)

(72) Inventors: Abdulkadir M. Hussein, Edmonton (CA); Hussein M Hussein, Phoenix, AZ (US); Ibrahim O. Mohamed, Edmonton (CA)

(73) Assignee: Leap Comtec Limited (GB)

( * ) Notice: Subject to any disclaimer, the term of this patent is extended or adjusted under 35 U.S.C. 154(b) by 0 days.

(21) Appl. No.: 16/096,238

(22) PCT Filed: May 1, 2017

(86) PCT No.: PCT/CA2017/050527
§ 371 (c)(1),
(2) Date: Oct. 24, 2018

(87) PCT Pub. No.: WO2017/190232
PCT Pub. Date: Nov. 9, 2017

(65) Prior Publication Data
US 2019/0165824 A1    May 30, 2019

(30) Foreign Application Priority Data
May 5, 2016  (CA) ...................... 2928994

(51) Int. Cl.
| | |
|---|---|
| *H04B 1/3827* | (2015.01) |
| *H04W 88/02* | (2009.01) |
| *H04M 1/725* | (2006.01) |
| *H04W 88/06* | (2009.01) |
| *H04W 52/02* | (2009.01) |
| *H04W 52/28* | (2009.01) |

(52) U.S. Cl.
CPC ...... *H04B 1/3838* (2013.01); *H04M 1/72569* (2013.01); *H04M 1/72577* (2013.01);
(Continued)

(58) Field of Classification Search
CPC ......... H04B 1/3838; H04B 2001/3844; H04M 1/72569; H04M 1/72577; H04W 52/288; H04W 88/06
(Continued)

(56) References Cited

U.S. PATENT DOCUMENTS

| | | |
|---|---|---|
| 8,565,205 B2 | 10/2013 | Ho et al. |
| 9,445,372 B1 * | 9/2016 | Lee ..................... H04W 52/028 |

(Continued)

FOREIGN PATENT DOCUMENTS

EP    1 299 664 B1    12/2008

OTHER PUBLICATIONS

International Search Report dated Aug. 16, 2017 for Int. Appl. No. PCT/CA2017/050527, 8 pp.

*Primary Examiner* — William Nealon
(74) *Attorney, Agent, or Firm* — James A. Sheridan; Sheridan Law, LLC

(57) ABSTRACT

A method and system is provided that reduces SAR resulting from RF electromagnetic field radiation of mobile communication device that is exposed to the user while holding it next to the ear or carrying it next to the body. Based on the method, a software application will run on the mobile devices that applies safety rules, adapts dynamically to the user's environment and preference during the critical use-cases when the mobile device is held next to the ear or when it is carried next to the body, and when there are strong signals at the user's current location from multiple transmitting systems that include but not limited to WiFi access points and cellular base station.

17 Claims, 8 Drawing Sheets

(52) U.S. Cl.
CPC ..... *H04W 52/0245* (2013.01); *H04W 52/288* (2013.01); *H04W 88/02* (2013.01); *H04B 2001/3844* (2013.01); *H04M 1/72519* (2013.01); *H04W 88/06* (2013.01); *Y02D 70/10* (2018.01); *Y02D 70/1222* (2018.01); *Y02D 70/14* (2018.01); *Y02D 70/142* (2018.01); *Y02D 70/144* (2018.01); *Y02D 70/166* (2018.01); *Y02D 70/40* (2018.01)

(58) Field of Classification Search
USPC ...................................................... 455/552.1
See application file for complete search history.

(56) References Cited

U.S. PATENT DOCUMENTS

| | | | |
|---|---|---|---|
| 2009/0047998 A1* | 2/2009 | Alberth, Jr. ............ | H04W 52/42 455/562.1 |
| 2010/0272085 A1* | 10/2010 | Baier .................... | G01S 5/0252 370/338 |
| 2011/0263216 A1* | 10/2011 | Lee ...................... | H04B 1/0475 455/127.1 |
| 2011/0281558 A1* | 11/2011 | Winter .................. | H04L 63/107 455/411 |
| 2011/0309942 A1 | 12/2011 | Hyde et al. | |
| 2014/0370830 A1* | 12/2014 | Steer .................... | H04W 52/18 455/127.1 |
| 2015/0031326 A1 | 1/2015 | Begin et al. | |
| 2015/0181531 A1* | 6/2015 | Zajac .................... | G06F 1/3212 455/574 |
| 2016/0072538 A1 | 3/2016 | Niemi | |
| 2017/0054840 A1* | 2/2017 | Kobayashi ............. | H04B 1/385 |
| 2017/0311330 A1* | 10/2017 | Gandhi ............... | H04W 72/082 |

\* cited by examiner

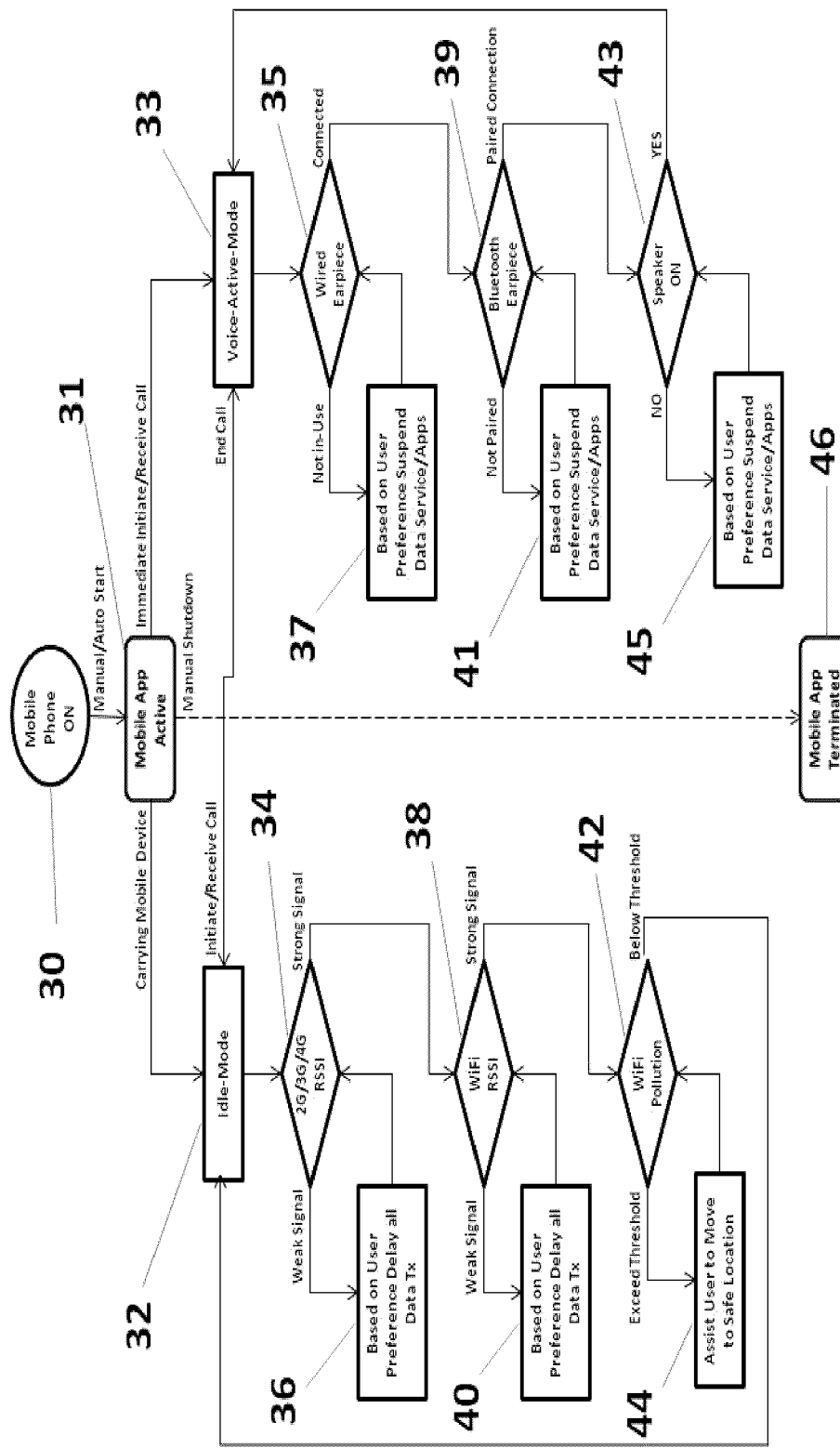
Figure 13. Flow Chart

SYSTEM AND METHOD OF REDUCING SPECIFIC ABSORPTION RATE FROM MOBILE DEVICES

CROSS-REFERENCE TO RELATED APPLICATIONS

This application claims the benefit of Canadian Patent Application No. 2928994, filed May 5, 2016, the entirety of which is incorporated herein by reference.

FIELD OF THE INVENTION

The invention relates generally to mobile communication devices and in particular mobile phones that use standardized and proprietary radio technology to send and receive voice calls, information and multimedia communication.

BACKGROUND OF THE INVENTION

Technological advancement of the current age of infocomtainment (information, communication and entertainment) has led to the proliferation of the use of mobile devices, especially mobile phones, and they become an integral aspect of people's daily life. The core of these technologies are wireless communication systems using varies elaborate waveforms that gets converted to radio frequency (RF) and radiated out via electromagnetic fields to link between the users of the mobile devices and networks providing services. These wireless-based technologies enabled ubiquitously connection for the modem social forums. However, potential side effects of the underlying wireless technologies to the people are often ignored and therefore receive inadequate precaution from users who are enjoying and very much dependent on the communication through the mobile devices.

When mobile phone technology was in the 2G stage the main service was voice that was based on circuit switched network. The mobile phones were transmitting RF electromagnetic field radiation only to perform periodic location update while they are in idle mode and carried around by the users. The periodicity of location update is usually mobile operator dependent and the operators set the timer in their networks that was optimum for their wireless coverage and service. The 2G mobile phone started supporting more than one wireless technology and Bluetooth technology became a common capability of the mobile phones. Additionally packet data service was introducing over the 2G wireless radio channels. Bluetooth was used for connecting wirelessly with earphones for hands-free use of the mobile phones. As a result in the 2G case of only circuit switched voice capable 2G networks, the exposure of SAR to the users' body were triggered by short RF transmissions for completing location update procedure for the wireless network and the Bluetooth beacon. But with the packet data services the location update procedure required longer RF transmission duration for updating both the packet switched network, causing relatively longer exposure of SAR to the users.

When the mobile technology evolved to 3G stage the data services become an increasing important service to users. As a result of the network evolution to the 3G, the location update procedure required significantly longer RF transmission duration for updating both high-speed packet data part of the network and the older circuit switched part of the network. More importantly, the 3G mobile phones support concurrent services and are capable of transmitting varied background data services like e-mail, file transfers, location based services and diagnostic logs to the manufacturers or vendors of operating system (OS) platforms. Furthermore, the OS platforms enabled a proliferation of third-party mobile applications (Apps) that provide communication and entertainment to the users and may continuously run in the background of the mobile phones. The 3G mobile phones transmit RF electromagnetic field radiation more frequently as a function of the number of background Apps, and all of these RF transmissions happen while the phone is carried. Furthermore, the phones started supporting more wireless technology, like WiFi and Near Field Communication (NFC), in addition to evolved Bluetooth technology. As a result of the users' demand for connectedness at all times, the exposure of SAR to the user's body increased considerably both in magnitude and duration and a user might not be aware of what their phone is doing other than noticing relatively faster battery power consumption during the day.

When technology evolved from 3G to 4G the wireless technology focused on data services and increased the data throughput to enable high-quality infocomtainment. The evolution from 4G to 5G appears to be continuing the trend of increasing the ability of the wireless technology to deliver higher throughput to the users and support higher quality of infocomtainment.

Exposure to RF electromagnetic field radiation may have long term negative health effects. Regulators have established limits to the maximum exposure of RF electromagnetic field radiation to users that sets the maximum transmit powers of mobile phone and other mobile device. Public health organizations also provide direct advice to users of mobile phones regarding protection against potential adverse health effects.

SUMMARY OF THE INVENTION

A method and system is provided to reduce SAR exposure to users of mobile communication devices resulting from inherent RF electromagnetic field radiation. The method and system manages RF transmissions in use-cases wherein a mobile communication device, for example a mobile phone, is held next to the side of the user's face during voice calls or when the device is carried around a position that is next to the body. The method and system impose a set of safety rules to both the mobile devices' services and to applications that autonomously require RF transmissions. These safety rules defensively manage information communication triggers subject to the quality of the radio link at the current location of the user while taking into consideration the user defined preferences. The safety rules adapt to the user behavior, user preferences and the current environment of the user's locale to reduce the SAR exposed to the user. The method and system also alerts the user when there are multiple transmitting systems with strong signals at the vicinity of the user's current location.

A method is provided of minimizing the SAR (specific absorption rate) to users resulting from RF (radio frequency) electromagnetic field radiation exposure of consumer mobile communication devices: handheld devices, mobile phone, tablet and laptop; that are capable of transmitting one or more signals: 2G/3G/4G, WiFi, Bluetooth, NFC and proprietary technology; to communicate with a remote receiving station or device like standard cellular base station, or WiFi access point, or Bluetooth equipped device, or NFC reader, or satellite ground station, or non-standard wireless station while carrying the mobile device next to the body or holding it next to the ear for voice calls.

The method may include reducing the mobile devices' transmit power by temporarily disabling all of cellular packet switched capabilities of 2.5G/3G/4G, WiFi capability, Bluetooth capability, NFC capability and any other non-standard wireless transmission capability during voice call when the user is not making use of either wired or wireless earphones, and not utilizing the device's speaker in which case the user typically holds the device next to the ear.

The method may include reducing a mobile device's transmit power by disabling all mobile Apps on the device and any platform OS (operating system) diagnostic logs that are using data services to send information during voice call when the user is not making use of either wired or wireless earphones, and not utilizing the device's speaker in which case the user typically holds the device next to the ear.

The method may include reducing the mobile devices' RF transmit power by temporarily disabling any of the disadvantaged technologies of cellular packet data capabilities, WiFi capability, Bluetooth capability, NFC capability and any other non-standard wireless transmission capability when the respective RSSI (received signal strength) is weak until the mobile device receives adequate RSSI level.

The method may include reducing the mobile devices' RF transmit power by temporarily disabling all actively running applications that are using the data communication services of the technology that is having the weak RSSI (received signal strength) for its connection to a remote base station or a device until the mobile device receives adequate RSSI level for the disadvantaged wireless technology.

The method may include permitting the user of the mobile device to enable certain critical and time-sensitive communication services or applications to be active at all the time or during user defined periods of the day in which case the safety rules will be applied accordingly while outside of the period the general safety rules apply.

The method may include alerting the user of the mobile device via audible and text notification when multiple strong signals from WiFi access points are present at the vicinity of the user's current location in which case the user is free to choose whether to remain the current RF electromagnetic field radiation polluted location or move away from it, and the user is given the option to either choose the number of access points that will trigger the alert or use a default number.

The method may include displaying on the mobile device WiFi RF electromagnetic field radiation environment profile of the current location of the user and calculated distances between the user and the WiFi access points.

The method may include maintaining and displaying on the mobile device a history of the WiFi RF electromagnetic field radiation environment profile of the locations the user had spent a period of time.

BRIEF DESCRIPTION OF THE DRAWINGS

FIG. 13 is a flowchart showing the process by which the safety rules are enforced.

DETAILED DESCRIPTION OF THE INVENTION

Figure 1:
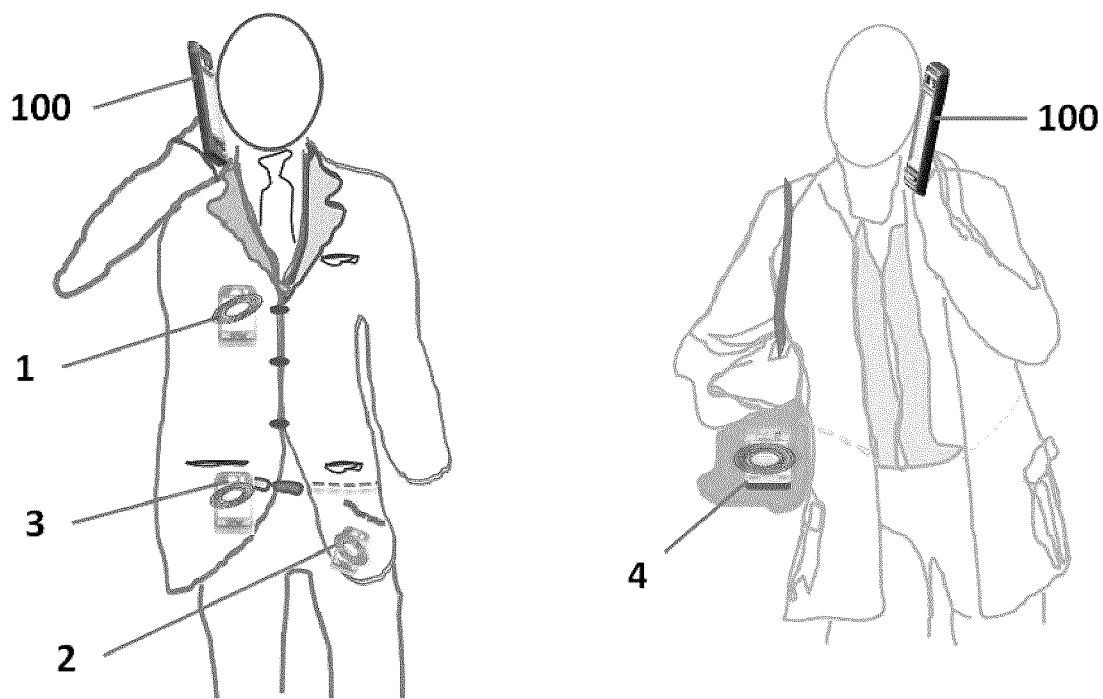
FIG. 1 shows a typical user and the locations on which the user may carry a mobile phone throughout the day.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The algorithms and displays with the applications described herein are not inherently related to any particular computer or other apparatus operative in controller. Various general-purpose systems may be used with programs in accordance with the teachings herein, or it may prove convenient to construct more specialized apparatus to perform the required machine-implemented method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

An embodiment of the invention may be implemented as a method or as a machine readable non-transitory storage medium that stores executable instructions that, when executed by a data processing system, causes the system to perform a method. An apparatus, such as a data processing system, can also be an embodiment of the invention. Other features of the present invention will be apparent from the accompanying drawings and from the detailed description which follows.

Terms

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "packet switching capabilities" means communication capabilities that a mobile device may use to transmit or receive packets, and includes, but is not limited to WiFi, cellular packet switching, Bluetooth, and NFC.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g. 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way the scope of the disclosed invention(s). An Abstract has been included in this application merely because an Abstract of not more than 150 words is required under 37 C.F.R. section 1.72(b) and corresponding statutes in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The invention can be implemented in numerous ways, including as a process, an apparatus, a system, a computer readable medium such as a computer readable storage medium or a computer network wherein program instructions are sent over optical or communication links. In this specification, these implementations, or any other form that the invention may take, may be referred to as systems, techniques, processes, methods or algorithms. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

The following discussion provides a brief and general description of a suitable computing environment in which various embodiments of the system may be implemented, for example, which may be present on a controller. Although not required, embodiments will be described in the general context of computer-executable instructions, such as program applications, modules, objects or macros being executed by a computer. Those skilled in the relevant art will appreciate that the invention can be practiced with other computer configurations, including hand-held devices, multiprocessor systems, microprocessor-based or programmable consumer electronics, personal computers ("PCs"), network PCs, mini-computers, mainframe computers, and the like. The embodiments can be practiced in distributed computing environments, such as a cloud, where tasks or modules are performed by remote processing devices, which are linked through a communications network. In a distributed computing environment, program modules may be located in both local and remote memory storage devices.

A computer system may be used as a server including one or more processing units, system memories, and system buses that couple various system components including system memory to a processing unit. Computers will at times be referred to in the singular herein, but this is not intended to limit the application to a single computing system since in typical embodiments, there will be more than one computing system or other device involved. Other computer systems may be employed, such as conventional and personal computers, where the size or scale of the system allows. The processing unit may be any logic processing unit, such as one or more central processing units ("CPUs"), digital signal processors ("DSPs"), application-specific integrated circuits ("ASICs"), etc. Unless described otherwise, the construction and operation of the various components are of conventional design. As a result, such components need not be described in further detail herein, as they will be understood by those skilled in the relevant art.

A computer system includes a bus, and can employ any known bus structures or architectures, including a memory bus with memory controller, a peripheral bus, and a local bus. The computer system memory may include read-only memory ("ROM") and random access memory ("RAM"). A basic input/output system ("BIOS"), which can form part of the ROM, contains basic routines that help transfer information between elements within the computing system, such as during startup.

The computer system also includes non-volatile memory. The non-volatile memory may take a variety of forms, for example a hard disk drive for reading from and writing to a hard disk, and an optical disk drive and a magnetic disk drive for reading from and writing to removable optical disks and magnetic disks, respectively. The optical disk can be a CD-ROM, while the magnetic disk can be a magnetic floppy disk or diskette. The hard disk drive, optical disk drive and magnetic disk drive communicate with the processing unit via the system bus. The hard disk drive, optical disk drive and magnetic disk drive may include appropriate interfaces or controllers coupled between such drives and the system bus, as is known by those skilled in the relevant art. The drives, and their associated computer-readable media, provide non-volatile storage of computer readable instructions, data structures, program modules and other data for the computing system. Although a computing system may employ hard disks, optical disks and/or magnetic disks, those skilled in the relevant art will appreciate that other types of non-volatile computer-readable media that can store data accessible by a computer system may be employed, such a magnetic cassettes, flash memory cards, digital video disks ("DVD"), Bernoulli cartridges, RAMs, ROMs, smart cards, etc.

Various program modules or application programs and/or data can be stored in the computer memory. For example, the system memory may store an operating system, end user application interfaces, server applications, and one or more application program interfaces ("APIs").

The computer system memory also includes one or more networking applications, for example a Web server application and/or Web client or browser application for permitting the computer to exchange data with sources via the Internet, corporate Intranets, or other networks as described below, as well as with other server applications on server computers such as those further discussed below. The networking application in the preferred embodiment is markup language based, such as hypertext markup language ("HTML"), extensible markup language ("XML") or wireless markup language ("WML"), and operates with markup languages that use syntactically delimited characters added to the data of a document to represent the structure of the document. A number of Web server applications and Web client or browser applications are commercially available, such those available from Mozilla and Microsoft. The operating system and various applications/modules and/or data can be stored on the hard disk of the hard disk drive, the optical disk of the optical disk drive and/or the magnetic disk of the magnetic disk drive.

A computer system can operate in a networked environment using logical connections to one or more client computers and/or one or more database systems, such as one or more remote computers or networks. A computer may be logically connected to one or more client computers and/or database systems under any known method of permitting computers to communicate, for example through a network such as a local area network ("LAN") and/or a wide area network ("WAN") including, for example, the Internet. Such networking environments are well known including wired and wireless enterprise-wide computer networks, intranets, extranets, and the Internet. Other embodiments include other types of communication networks such as telecommunications networks, cellular networks, paging networks, and other mobile networks. The information sent or received via the communications channel may, or may not be encrypted. When used in a LAN networking environment, a computer is connected to the LAN through an adapter or network interface card (communicatively linked to the system bus). When used in a WAN networking environment, a computer may include an interface and modem or other device, such as a network interface card, for establishing communications over the WAN/Internet.

In a networked environment, program modules, application programs, or data, or portions thereof, can be stored in a computer for provision to the networked computers. In one embodiment, the computer is communicatively linked through a network with TCP/IP middle layer network protocols; however, other similar network protocol layers are used in other embodiments, such as user datagram protocol ("UDP"). Those skilled in the relevant art will readily recognize that these network connections are only some examples of establishing communications links between computers, and other links may be used, including wireless links. While in most instances a computer will operate automatically, where an end user application interface is provided, a user can enter commands and information into the computer through a user application interface including input devices, such as a keyboard, and a pointing device, such as a mouse. Other input devices can include a microphone, joystick, scanner, etc. These and other input devices are connected to the processing unit through the user application interface, such as a serial port interface that couples to the system bus, although other interfaces, such as a parallel port, a game port, or a wireless interface, or a universal serial bus ("USB") can be used. A monitor or other display device is coupled to the bus via a video interface, such as a video adapter. The computer can include other output devices, such as speakers, printers, etc.

The following description with reference to the accompanying figures discloses an embodiment of the invention for use in mobile phones to reduce the potential harm of SAR resulting from the RF electromagnetic field radiation exposed to users. The focus on one of the possible embodiment of the invention is not meant to limit the scope of the invention and it shall be understood that the embodiment also applies to wide range of mobile devices that have wireless technologies. Examples of these other mobile devices include tablets, laptops, mobile multimedia players, handheld video games, barcode scanners and the likes.

Figure 3:
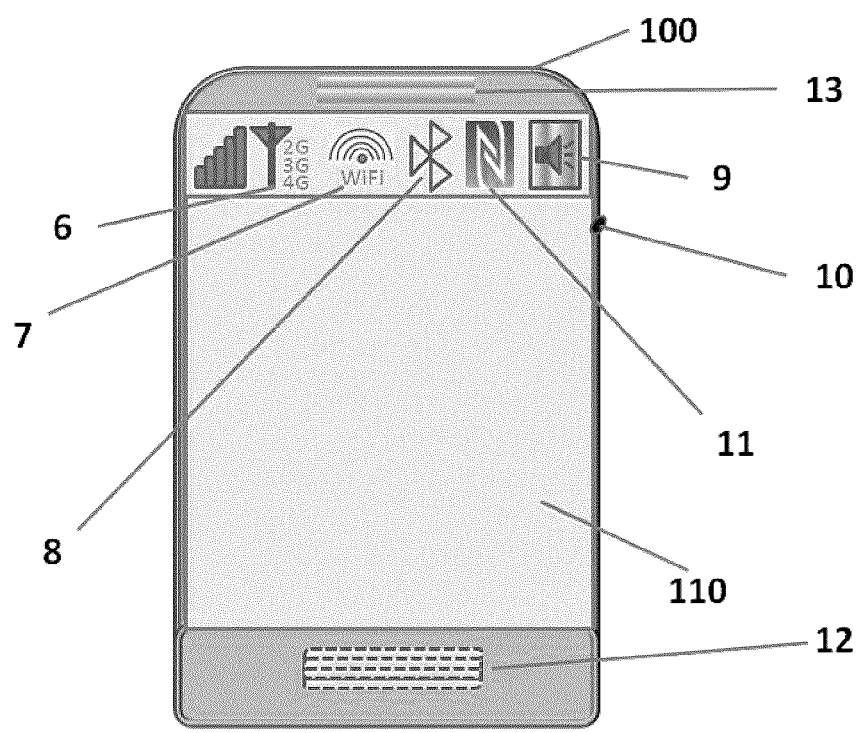
FIG. 3 shows an embodiment of the display of a typical mobile phone equipped with multiple wireless technologies.

Mobile phones and other mobile devices like tablets and laptops are configured to display supported wireless technologies to the user. FIG. 3 illustrates a typical mobile phone (100) that is equipped with multiple wireless technologies. Display (110) shows standard cellular technologies (6) that a mobile phone supports may be using, including one or multiple bands i.e. 900/1800 MHz for 2G, 2100 Mhz for 3G and 2700 Mhz or other standardized bands for 4G and beyond. The mobile phone may be also using these wireless technologies concurrently with others, especially in cases when the mobile phone is located in a disadvantaged location. Typical mobile phones (100) also support and display WiFi technology (7) that also operates in multiple bands but the wireless connection is established using only a particular band among the supported bands. In addition, mobile phones (100) commonly have and display a Bluetooth connection (8), a speaker-active indicator (9) for talking and hearing voice call conversations through a microphone (12), and a speaker (13) built in to the mobile phone (100) to allow use of the phone (100) without holding requiring the phone (100) to be next to the ear and the side of the user's face. It is also standard for mobile phone (100) to have a wired earpiece jack (10).

FIG. 1 illustrates the typical ways in which users carry their mobile phones (100) throughout the day when the users are not interacting with the mobile phones. It is also possible that some of the users carry and use more than one mobile phone. The mobile phones may be carried in pockets (1) of shirts, jackets, blazers, coats that position the mobile phone next to the upper part of the users' body. Similarly mobile phones are carried in the pockets (2) of trousers or slacks or pants that position the mobile phone next to just below waistline of the users' body. Mobile phones are also carried on belt-clips (3) that position the mobile phone right on the waistlines of the user's body, and in purses or handbags (4) that could position the mobile phone next to either upper body or around the waistline of the user.

Figure 5:
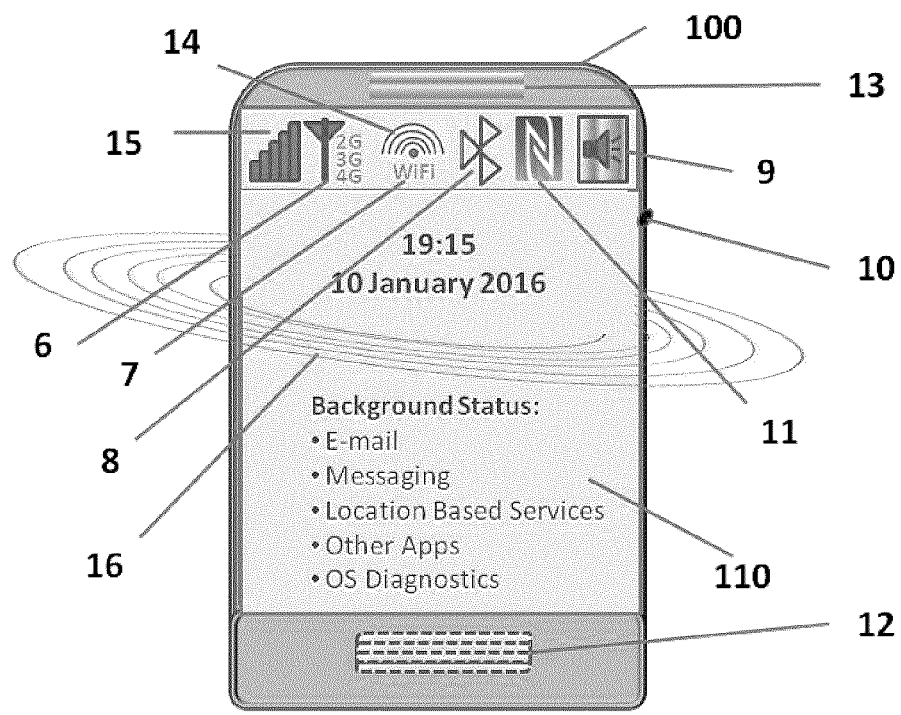
FIG. 5 shows an embodiment of a display of a mobile phone demonstrating the transmission of RF electromagnetic field radiation from one or more wireless technologies.

A mobile phone (100) may be described as in "idle-mode" state when there is no active voice call. However, as shown in FIG. 5, RF electromagnetic radiation field are emitted from mobile phone (100) from the data dominated services and the user's demand for infocomtainment while in the "idle-mode" state. It should be clearly understood that the mobile phone (100) and other similar devices have continuously active applications and services that require transmissions that will trigger RF electromagnetic field radiation that is continuously exposed to the users causing health and safety concerns.

Figure 2:
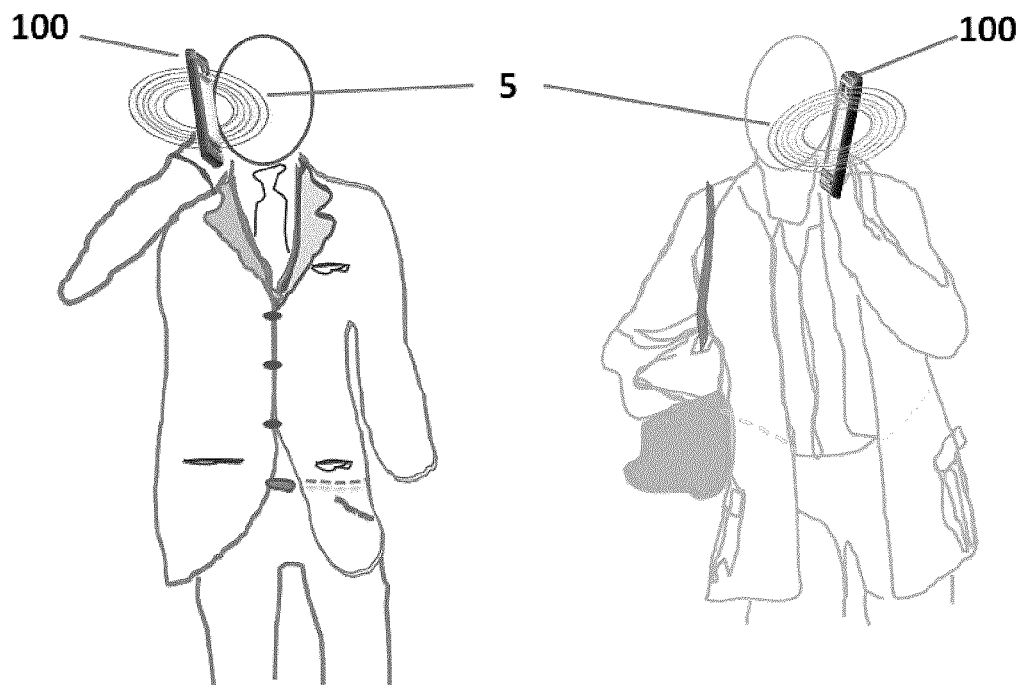
FIG. 2 shows representative illustrations of how people typically hold their mobile phone next to the ear and the side of the face when using the phone for voice calls and the mobile phone's RF electromagnetic field radiation.
Figure 6:
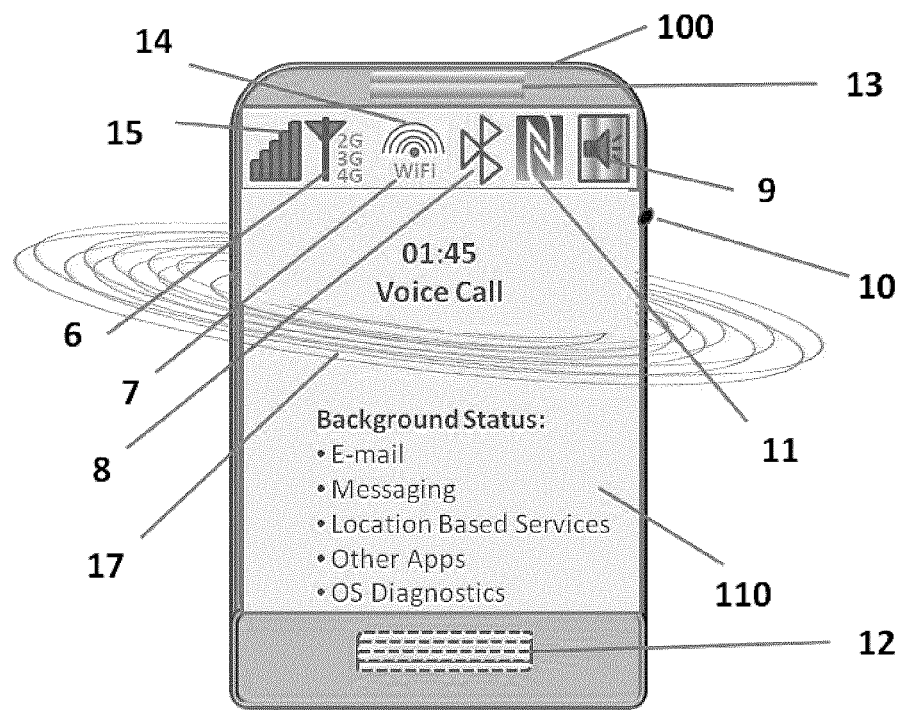
FIG. 6 shows an embodiment of a display of a mobile phone during a voice call while background services and applications remain concurrently active.

Users typically hold a mobile phone (100) next to their ears and on the side of their face when using the mobile phone for voice conversation. FIG. 2 illustrate users holding the mobile phone (100) next to their ear for a voice conversation. The position (5) of the mobile phone (100) causes SAR at the head of the user due to the expose of the RF electromagnetic field radiation. The radiation exposure and SAR is relatively higher for mobile phones (100) that have infocomtainment active in the background when the mobile phone (100) is used for voice conversation, as shown in FIG. 6, and is held next to the ear and the face of the user. According to an embodiment of the invention safety rules are applied to all active applications in the background and the active wireless technologies for data services which the system may de-activate during voice calls to prevent transmission of signals other than RF signals required for the voice call.

Figure 7:
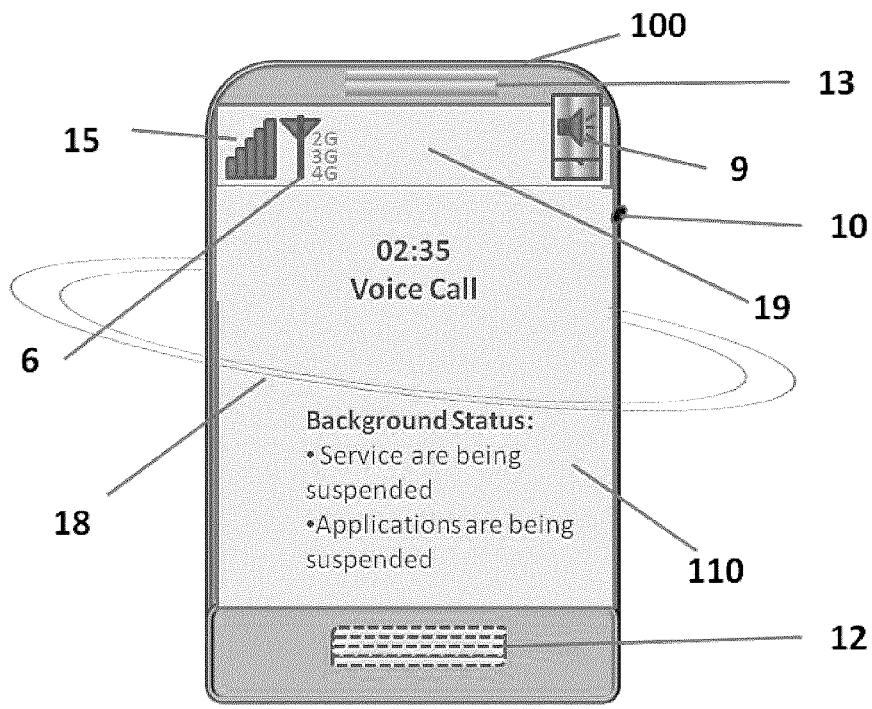
FIG. 7 shows an embodiment of a display of a mobile phone enforcing the safety rules according to the invention that reduce the autonomous transmissions of RF electromagnetic field.
Figure 8:
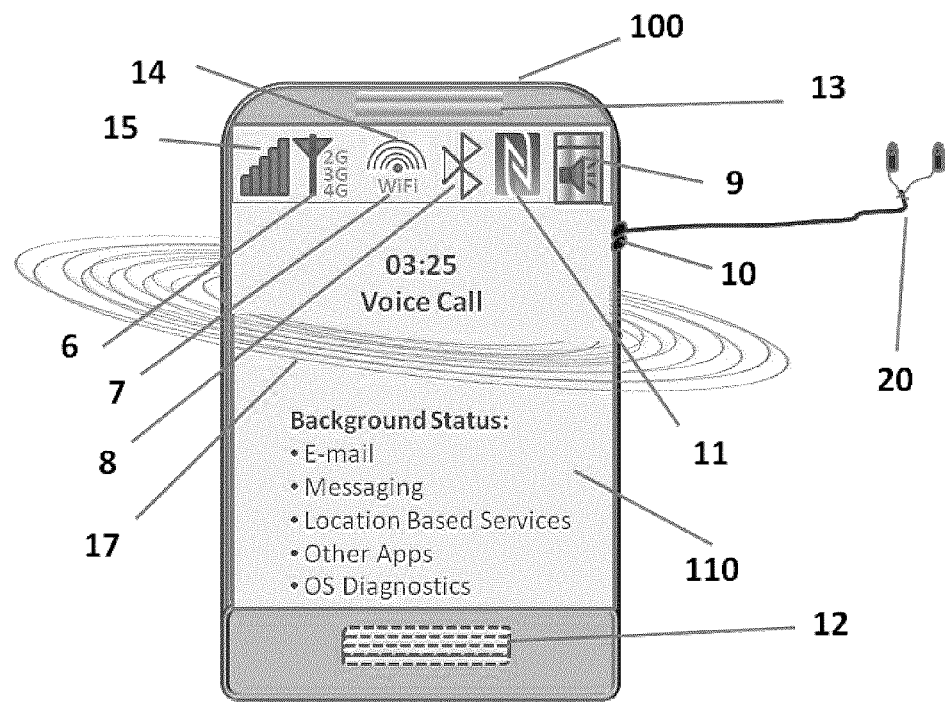
FIG. 8 shows an embodiment of a display of a mobile phone enforcing the safety rules according to the invention while the user has a wired earphone connected to the mobile phone.
Figure 9:
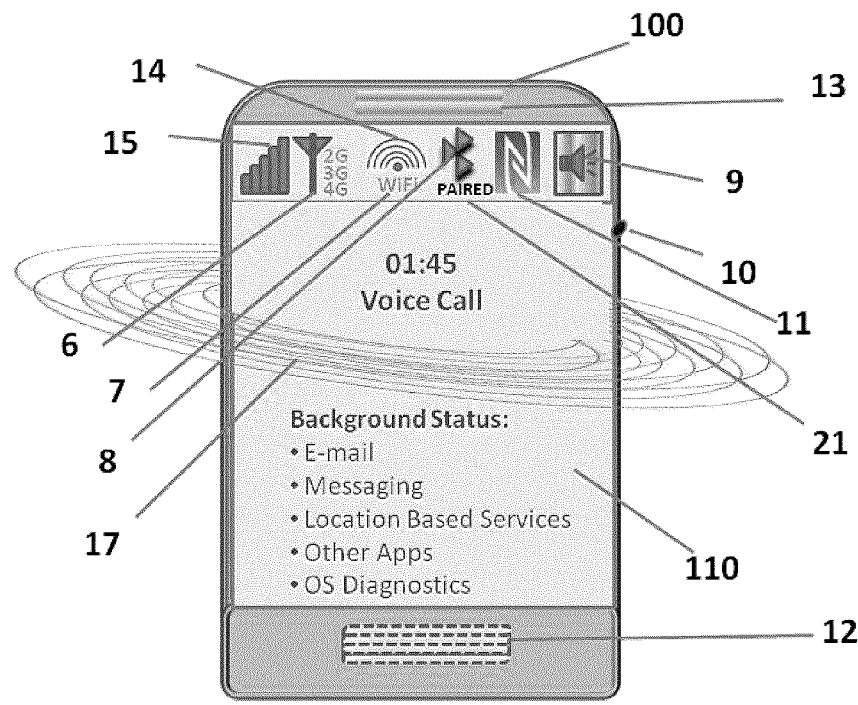
FIG. 9 shows an embodiment of a display of a mobile phone enforcing the safety rules according to the invention while the user has a Bluetooth earphone paired with the mobile phone.
Figure 10:
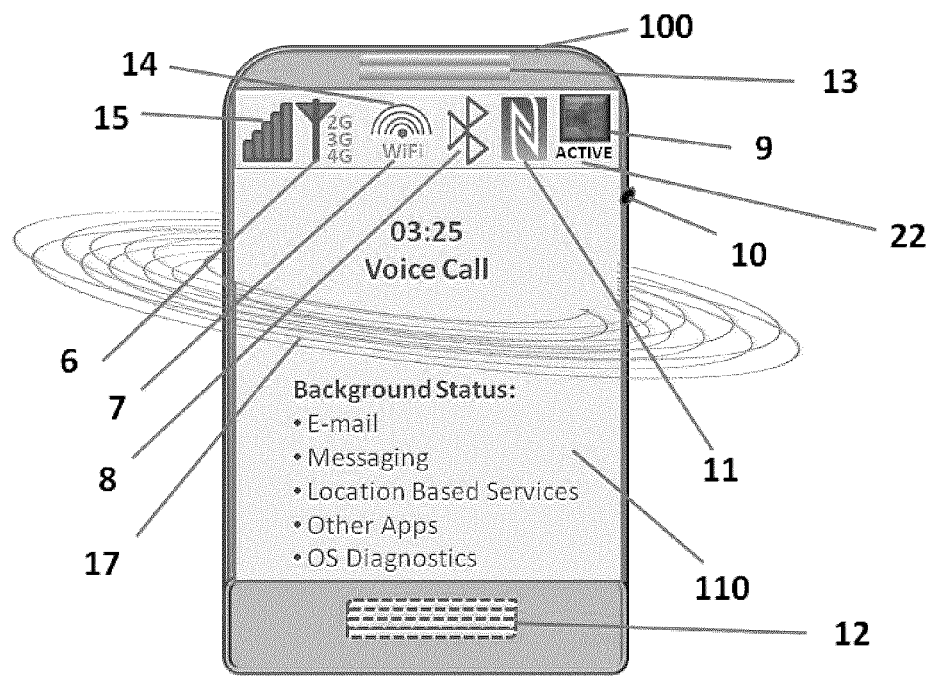
FIG. 10 shows an embodiment of a display of a mobile phone enforcing the safety rules according to the invention while the user has the speaker of mobile phone active.

Typically, the industry accepted duty cycle of a mobile phone (100) for voice calls is 40% and this means the mobile phone (100) will require only 40% of RF transmission during a voice call. A shown in FIG. 7, the system and method according to the present invention keep the mobile phone (100) only transmitting RF signals pertaining to the voice call when the user is not using wired or wireless earpieces or talking through a speaker. FIG. 8 illustrates an embodiment of invention when the mobile phone (100) is connected with a wired earpiece (20) and the user is using the earpiece (20) for the voice call. Similarly, FIG. 9 illustrates an embodiment of the invention wherein the mobile phone (100) is used with a Bluetooth (21) paired device for a voice call. FIG. 10 illustrates an embodiment of the invention wherein the mobile phone (100) has built-in speaker (22) active for a voice call. In all these three case presented in FIGS. 8-10, an embodiment of the invention will not affect any of the background services and application that are requiring wireless transmissions and causing relatively higher RF electromagnetic field radiations because it is assumed that the mobile phone (100) will be held away from next to the ear or the side of the face.

Figure 4:
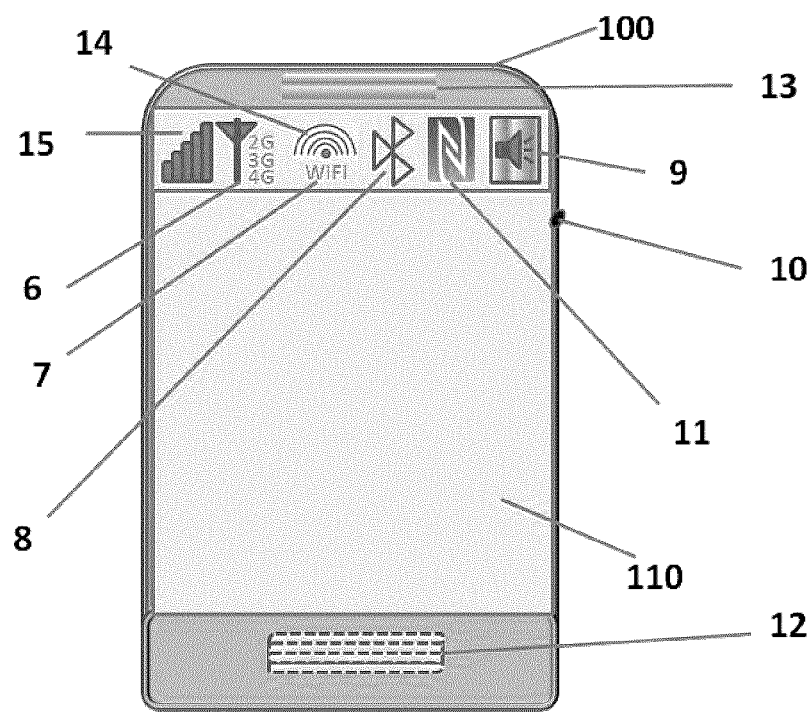
FIG. 4 shows an embodiment of the display of a mobile phone indicating the Received Signal Strength Indicator (RSSI) status.
Figure 11:
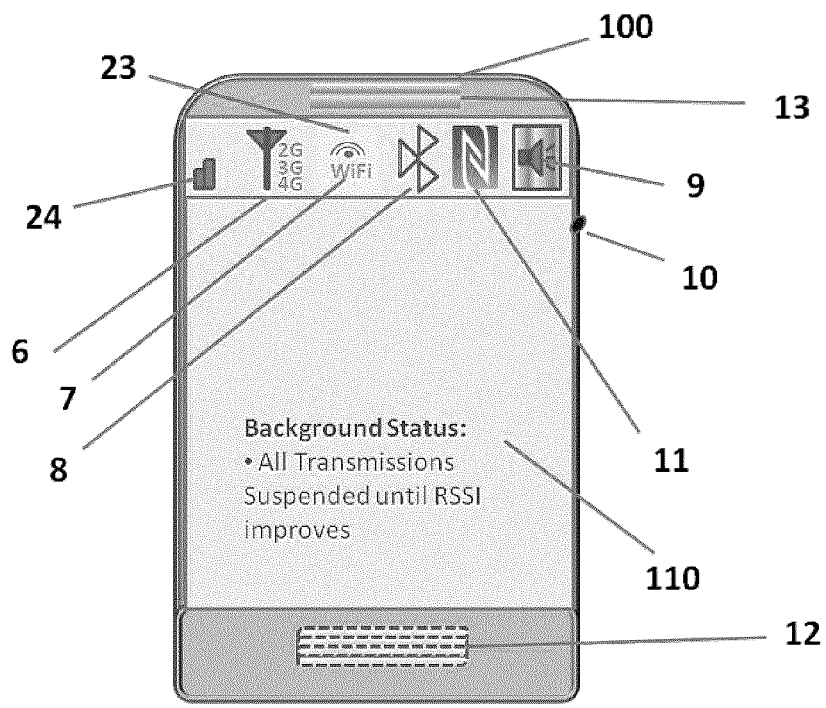
FIG. 11 shows an embodiment of a display of a mobile phone illustrating weak RSSI from cellular technology and WiFi technology connections due to a disadvantaged or impaired radio channel.

FIG. 4 illustrate a mobile phone (100) that receives a weak signal due to a radio channel condition of the affected wireless technology. The affected wireless technology, either cellular (14) or WiFi (15) or both, will have their respective indicators display a weak RSSI levels. The term "weak" is used to represent a low quality signal, for example less than or equal to 40% of an optimal signal strength. Due to this condition of the mobile phone (100)'s disadvantaged radio channel, the mobile phones increase their transmit power level in order to maintain the wireless link until they reach to the maximum permitted RF transmit power. This condition of the mobile phone (100) transmitting higher RF power levels caused by impaired wireless channel applies to both mobile phone modes of operation: idle-mode (when the mobile phone (100) is carried around with services and applications running in the background), and to voice-active-mode (when the mobile phone (100) has active voice call in addition to the services and applications running in the background). An embodiment of the present invention, as shown in FIG. 11, applies safety rules to the mobile phone (100) that will temporarily disable all services and applications that require RF transmissions during the idle-mode and during voice-active-mode states while the radio channel condition remains disadvantaged. Mobile phone RF transmissions will be restored when the radio channel condition improves and it will use just enough power to close the link with the serving base station.

The embodiment of the invention may have a configurable time period (T1) in which on expiration of this period, if the status of the low RSSI level remains unchanged then the disabled services and applications that require RF transmission will be allowed and enabled to transmit for a brief configurable period (T2), and then the RF transmission will be disabled again and this cycle will continue until the RSSI returns to adequate levels. The safety rules ensure that the mobile phones transmit low to moderate RF signal to maintain the wireless links and their associated quality of service parameters that the cellular systems manages. Since mobile phones increase their RF transmit power when the quality of the radio channel is poor (as indicated by low RSSI), this embodiment of the invention reduces the RF electromagnetic field radiation exposure to the users and the resulting SAR to user's body.

Figure 12:
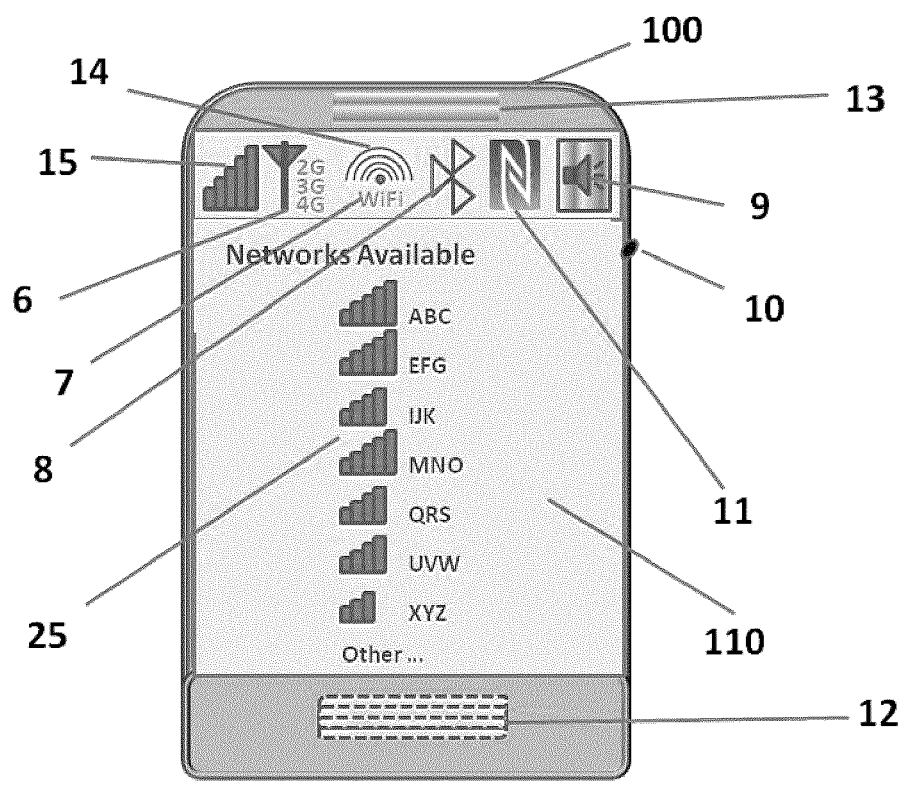
FIG. 12 shows an embodiment of a display of a mobile phone illustrating RF signals received from WiFi access points and other WiFi transmitting devices.

FIG. 12 illustrate a mobile phone (100) displaying all WiFi signals that are received at a given point in time at a particular location. Due to the rapid deployment of WiFi access points to offload ever increasing load of data services on the cellular networks, the possibility of the user being located near WiFi access points' RF electromagnetic signal field pollution substantially increased. This embodiment of invention tracks available RSSIs (25) and the number of WiFi access points accessible to the mobile phone (100) throughout the day to determine a level of "pollution". The system will alert the user if a configurable threshold number of access points and their RSSI is reached and suggests the user to move away from the current location. This embodiment will calculate and display the direction that is safest to move from the current location and approximate distance from the current location. The system will maintain a daily chart that show user's exposure to WiFi access points' RF electromagnetic field radiation that triggered the preset threshold when the user remained the same location for a minimum period of 5 minutes and the location of the event. The system will maintain a similar chart of the cellular signal that is extracted from neighbor list, active list, candidate list and similar lists that the mobile phone maintains.

FIG. 13 displays an embodiment of the process according to the invention. A mobile phone is chosen to illustrate the steps that are involved in the process as a mobile phone typically includes a good representation of the wireless technologies that are commonly available to the mobile devices. Upon installing an embodiment of the invention in the form of an application on the mobile phone the application becomes active (31). However, if the mobile phone is turned off by the user after the application is installed then when the mobile phone is turned on (30) and the mobile phone completes the acquisition of the serving wireless network technologies, the mobile phone will start up the various programs and applications running on the mobile phone and the application becomes active (31). The logic of the application begins to adapt the mobile phone radio channel conditions and user behavior. There are two possibilities when the mobile phone completes the initialization process. In the first case the mobile phone is in idle-mode (32), for example the phone is simply slipped into the pocket or purse or however the user decides to carry it. In the second case the mobile phone is in voice-active-mode where the user decides to make a voice call immediately. In the first case, while the phone is in the idle-mode (30) if the user initiates a voice call at any time then the process transitions to voice-active-mode (32). Also in this first case, if the received signal strength becomes weak for cellular (34) or WiFi (38) connection then data transmissions will be delayed that are using the cellular network (36) or the WiFi network (40) until received signal strength returns to optimum. The application also tracks WiFi "pollution" (42) environment condition while in the idle-mode (32) from all received WiFi signals. If the application threshold is violated then it alerts the user and it assists the user to move to a less polluted location. In the second case, when the voice call is terminated the process transitions from voice-active-mode (33) to idle-mode (32). Also in the second case while the user is either initiating a call or receiving a call in the voice-active-mode (33) the hands-free conditions are checked. If wired earphone (35) or Bluetooth earpiece (39) or the speaker phone is not in use then the data services through all wireless technologies and/or one or more applications that are using the data services are suspended during the voice call. Any delays or suspensions of data services and applications caused by the application are released after taking into account user preferences. The process ends when the user ends the application manually (46) or the mobile phone is turned off.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various methods described above may omit some acts, include other acts, and/or execute acts in a different order than set out in the illustrated embodiments.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

The invention claimed is:

1. A method for reducing specific absorption rate (SAR) exposure in a user of a mobile device, the exposure resulting from radiofrequency electromagnetic field radiation from the mobile device that autonomously requires radiofrequency transmission for communication with a remote receiving station, including packet switching capabilities to transmit or receive data from a packet switched network, the method comprising:

imposing a set of safety rules with respect to data services and applications for reducing the specific absorption rate exposure from the mobile device, the safety rules applied by a SAR software application (SAR app) on the mobile device, the SAR app including a menu of user-defined preferences to enable selected ones of the data services and the applications to remain active while temporarily disabling other ones of the data services and the applications, the safety rules configured to reduce the specific absorption rate exposure to the user by temporarily disabling the selected one of the data services or the applications on the device that require radiofrequency transmission, wherein the imposed safety rules are adapted to temporarily disable the other ones of the data services or the applications on the device by the user-defined preferences as preselected on the menu of the SAR app by the user and by the user's current environment to reduce the specific absorption rate exposure to the user.

2. The method of claim 1, wherein the method comprises determining if, during a voice call on the mobile device, earphones or a speaker are being used, and if not, imposing the set of safety rules.

3. The method of claim 1, wherein the set of safety rules are imposed by one or more of, temporarily disabling the mobile device's services that use cellular packet switched capabilities, temporarily disabling the applications or delaying the data transmission requirements of the applications, temporarily disabling platform operating system diagnostic logs.

4. The method of claim 3, wherein the set of safety rules are further imposed by, determining if any of the mobile device's cellular packet switched capabilities are disadvantaged by having weak respective received signal strengths, and temporarily disabling or delaying data transmissions over the disadvantaged cellular packet switched capabilities.

5. The method of claim 4, wherein the set of safety rules are further imposed by, determining if any of the mobile device's applications are disadvantaged by having weak respective received signal strengths, and temporarily disabling or delaying the disadvantaged applications.

6. The method of claim 1, wherein the set of rules are imposed to reduce the specific absorption rate to a user of the mobile device operating within regulator established limits of maximum exposure.

7. The method of claim 1, wherein the method may further comprise permitting a user of the mobile device to modify the set of rules being imposed by enabling certain services over the packet switching capabilities or the applications to be active during predetermined times.

8. The method of claim 1, wherein the method further comprises alerting the user with the SAR app on the mobile device when radiofrequency electromagnetic field radiation signals received at the user's current location exceed a predetermined threshold in user defined preferences.

9. The method of claim 1, wherein the method further comprises displaying, on the mobile device, a radiofrequency electromagnetic field radiation profile of the user's current location.

10. The method of claim 9, wherein the method further comprises:
determining the location of the remote receiving stations that are transmitting signals to the mobile device, calculating between the current location of the mobile device and each of the remote receiving stations that are transmitting signals to the mobile device, and displaying the calculated distances between the mobile device and each of the remote receiving stations.

11. The method of claim 9, wherein the method further comprises maintaining, on mobile device, a history of the radiofrequency electromagnetic field radiation profile of the mobile device's location that triggered alerts of specific absorption rate exposure limits being reached or exceeded.

12. The method of claim 1, wherein the mobile device may comprise a handheld device, a mobile phone, a tablet, or a laptop.

13. The method of claim 1, wherein the data communication over cellular packet switched capabilities comprise 2.5G, 3G, 4G, 5G, WiFi, Bluetooth, near field communication, or any other non-standard wireless transmission capabilities.

14. The method of claim 1, wherein the remote receiving station is transmitting a signal and may comprise another mobile device, a standard cellular base station, a WiFi access point, a Bluetooth equipped device, a near field communication reader, a satellite ground station, or any other non-standard wireless station.

15. A method for reducing specific absorption rate exposure in a user of a mobile device, the exposure resulting from radiofrequency electromagnetic field radiation from the mobile device that autonomously requires radiofrequency transmission for communication with a remote receiving station, including packet switching capabilities to transmit or receive data from a packet switched network, the method comprising:
imposing a set of safety rules for reducing the specific absorption rate exposure from the mobile device by temporarily disabling of the services or the applications on the device that require radiofrequency transmission, wherein the imposed safety rules are adapted by user-defined preferences and by the user's current environment;
wherein the method further comprises displaying, on the mobile device, a radiofrequency electromagnetic field radiation profile of the user's current location.

16. The method of claim 15, wherein the method further comprises:
determining the location of the remote receiving stations that are transmitting signals to the mobile device, calculating between the current location of the mobile device and each of the remote receiving stations that are transmitting signals to the mobile device, and displaying the calculated distances between the mobile device and each of the remote receiving stations.

17. The method of claim 9, wherein the method further comprises maintaining, on mobile device, a history of the radiofrequency electromagnetic field radiation profile of the mobile device's location that triggered alerts of specific absorption rate exposure limits being reached or exceeded.

* * * * *